US012661685B2

(12) United States Patent
Wiehe et al.

(10) Patent No.: US 12,661,685 B2
(45) Date of Patent: Jun. 23, 2026

(54) MODIFICATION UNIT AND APPLICATION DEVICE FOR APPLYING FLOWABLE MEDIUM ONTO A SUBSTRATE

(71) Applicant: Focke & Co. (GmbH & Co. KG), Verden (DE)

(72) Inventors: Martin Wiehe, Buxtehude (DE); Martin Eilts, Friedeburg (DE); Jan-Christian Walter, Bardowick (DE)

(73) Assignee: Focke & Co. (GmbH & Co. KG), Verden (DE)

( * ) Notice: Subject to any disclaimer, the term of this patent is extended or adjusted under 35 U.S.C. 154(b) by 448 days.

(21) Appl. No.: 18/253,247

(22) PCT Filed: Nov. 10, 2021

(86) PCT No.: PCT/EP2021/081204

§ 371 (c)(1),
(2) Date: May 17, 2023

(87) PCT Pub. No.: WO2022/106275

PCT Pub. Date: May 27, 2022

(65) Prior Publication Data

US 2024/0017285 A1 Jan. 18, 2024

(30) Foreign Application Priority Data

Nov. 18, 2020 (DE) ......................... 102020130472.2

(51) Int. Cl.
*B05C 11/10* (2006.01)

(52) U.S. Cl.
CPC ...... *B05C 11/1026* (2013.01); *B05C 11/1034* (2013.01)

(58) Field of Classification Search
CPC ... B05C 5/0225; B05C 5/025; B05C 11/1002; B05C 11/1026; B05C 11/1034; H01F 7/18

(Continued)

(56) References Cited

U.S. PATENT DOCUMENTS

| | | | |
|---|---|---|---|
| 4,431,690 | A | 2/1984 | Nordson |
| 4,530,862 | A | 7/1985 | Kerzel |

(Continued)

FOREIGN PATENT DOCUMENTS

| | | | |
|---|---|---|---|
| DE | 602004006425 | T2 | 2/2008 |
| DE | 60038228 | T2 | 1/2009 |

(Continued)

OTHER PUBLICATIONS

WIPO, International Search Report (in a corresponding application), Mar. 14, 2022.

(Continued)

*Primary Examiner* — Kevin J Comber
(74) *Attorney, Agent, or Firm* — Laurence P. Colton; Smith Tempel Blaha LLC

(57) ABSTRACT

An application device for applying a flowable medium onto a substrate, having a discharge valve having a closure member which, in its open position, releases a metering opening of the discharge valve, such that the flowable medium can flow through the metering opening in the direction of the substrate, wherein the closure member is movable by an electromagnet of the discharge valve from a closing position, in which it closes the metering opening, to an open position, and having a main control unit, which is connected to the discharge valve, and which delivers electrical output voltage signals which moves and maintains the closure member to the open position. A modification unit is arranged between the main control unit and the discharge (Continued)

valve, which is configured such it receives output voltage signals from the main control unit, modifies these signals and relays the latter in a modified form to the electromagnet.

15 Claims, 4 Drawing Sheets

(58) Field of Classification Search
USPC .......................................................... 361/154
See application file for complete search history.

(56) References Cited

U.S. PATENT DOCUMENTS

| | | | | |
|---|---|---|---|---|
| 2002/0050579 | A1 | 5/2002 | Near | |
| 2004/0130845 | A1* | 7/2004 | Magyar | F16K 37/0083 361/160 |
| 2005/0279780 | A1* | 12/2005 | Evans | H01F 7/1805 222/504 |
| 2012/0095588 | A1 | 4/2012 | Barkmann | |
| 2013/0052359 | A1 | 2/2013 | Ahmadi | |
| 2017/0326576 | A1 | 11/2017 | Reid | |
| 2018/0001611 | A1* | 1/2018 | Lingier | C09J 7/38 |

FOREIGN PATENT DOCUMENTS

| | | | | |
|---|---|---|---|---|
| EP | 1155746 | A2 | 11/2001 | |
| EP | 2589437 | A2 | 5/2013 | |
| EP | 2638978 | A1 * | 9/2013 | B05C 11/1002 |
| WO | 2020005707 | A2 | 1/2020 | |

OTHER PUBLICATIONS

Deutsches Patent-Und Markenamt (German Patent and Trademark Office), Recherchebericht (search in a corresponding application), Jul. 7, 2021.

European Patent Office (EPO), Third Party Observation for Application No. EP20210811272, Jul. 25, 2025.

* cited by examiner

MODIFICATION UNIT AND APPLICATION DEVICE FOR APPLYING FLOWABLE MEDIUM ONTO A SUBSTRATE

CROSS REFERENCE TO RELATED APPLICATIONS

This application is the US national phase of and claims the benefit of and priority on International Application No. PCT/EP2021/081204 having an international filing date of 10 Nov. 2021, which claims priority on and the benefit of German Patent Application No. 10 2020 130 472.2 having a filing date of 18 Nov. 2020.

BACKGROUND OF THE INVENTION

Technical Field

The present invention relates to a device for the application of a flowable medium onto a substrate, in particular a hotmelt adhesive, having a discharge valve comprising a closure member which, in its open position, releases a metering opening of the discharge valve, such that the flowable medium can flow through the metering opening in the direction of the substrate, wherein the closure member is movable by an electromagnet of the discharge valve from a closing position, in which it closes the metering opening, to an open position, and comprising a main control unit which is connected to the discharge valve, particularly a PLC (programmable logic controller), and which delivers electrical output voltage signals, particularly in a periodic manner, for the controlled voltage supply of the electromagnet, which signals move the closure member to the open position and maintain the latter in this position.

Prior Art

Application devices with electromagnetically operated discharge valves are comprehensively known and are employed, for example, in the tobacco industry, in order to apply hotmelt adhesive portions to packaging elements of cigarette packs or similar such as, for example, tabs of packaging sections, which are to be mutually adhesively bonded. In simpler main control units, a periodic voltage signal is transmitted to the electromagnets of discharge valves which, in each case, assumes a constant amplitude over the signal duration, thereby resulting in a respectively constant current consumption of the electromagnets and, correspondingly, a respectively constant force, by means of which the closure member is firstly moved to the open position, and is then maintained therein. It is known, however, that the "holding current", which is required to hold a closure member which is already in the open position, may be smaller than the previously required opening current, which generates the actual opening movement. Disadvantageously, in these (simple) control systems, it is therefore necessary to accept a higher current consumption of electromagnets than is actually required.

The complete replacement of control systems of this type, which are frequently located in the switch cabinets of the corresponding application device, or of the machine which is assigned thereto, particularly in the case of high-speed valves, is a relatively cost-intensive operation, and is generally avoided.

BRIEF SUMMARY OF THE INVENTION

On the basis of this prior art, the object of the present invention is the further development of the above-mentioned device.

This object is fulfilled by an application device for applying a flowable medium onto a substrate, in particular a hotmelt adhesive, having a discharge valve comprising a closure member which, in its open position, releases a metering opening of the discharge valve, such that the flowable medium can flow through the metering opening in the direction of the substrate, wherein the closure member is movable by an electromagnet of the discharge valve from a closing position, in which it closes the metering opening, to an open position, and comprising a main control unit, which is connected to the discharge valve, particularly a PLC (programmable logic controller), and which delivers electrical output voltage signals, particularly in a periodic manner, for the controlled voltage supply of the electromagnet, which signals move the closure member to the open position and maintain the latter in this position, characterized in that a modification unit is arranged between the main control unit and the discharge valve, which is configured such it receives output voltage signals from the main control unit, modifies these signals and relays the latter in a modified form to the electromagnet, and by a modification unit for such an application device, for applying a flowable medium onto a substrate, in particular a hotmelt adhesive, wherein the application device is provided with a discharge valve comprising a closure member which, in its open position, releases a metering opening of the discharge valve, such that the flowable medium can flow through the metering opening in the direction of the substrate, wherein the closure member is movable by an electromagnet of the discharge valve from a closing position, in which it closes the metering opening, to an open position, and wherein the application device comprises a main control unit, which is connected to the discharge valve, particularly a PLC (programmable logic controller), and which delivers electrical output voltage signals, particularly in a periodic manner, for the controlled voltage supply of the electromagnet, which signals move the closure member to the open position and maintain the latter in this position, and wherein the modification unit is configured such that it can be arranged between the main control unit and the discharge valve, receives output voltage signals from the main control unit, modifies these signals and relays the latter in a modified form to the electromagnet.

Correspondingly, the above-mentioned application device according to the invention is characterized in that, between the main control unit and the discharge valve, a modification unit is arranged (and, in particular, is arranged between the main control unit and the discharge valve in an electrically series-connected arrangement of the main control unit, the modification unit and the discharge valve), which is configured such it receives output voltage signals from the main control unit, modifies these signals and relays the latter in a modified form to the electromagnet.

By means of a modification unit of this type, it is possible, inter alia, to convert application devices, the main control units of which deliver simple output voltage signals to the electromagnets of discharge valves, wherein there is no distinction between, firstly, an opening voltage for opening the discharge valve or moving the closure member from the closing position to the open position, and secondly a lower holding voltage for retaining the valve or the closure member in the open position, in a cost-effective and simple manner, such that a distinction of this type is possible. Advantageously, in this manner, current consumption of the respective discharge valve, and thus of the entire application device, can be reduced. At the same time, the electromagnets generate less waste heat, thereby reducing, inter alia, any unwanted influences of such waste heat upon the flowable medium, for example upon the viscosity of the flowable medium and, in consequence, upon the form and/or quantity of corresponding portions of the medium which are to be applied to the substrate.

In a preferred further development of this concept, it can be provided that, for the transmission of output voltage signals to the modification unit, a power cable is routed from the main control unit, which is or can be connected thereto, to the modification unit and that, for the transmission of modified output voltage signals to the electromagnet of the discharge valve, a power cable is routed from the modification unit to the discharge valve, which is or can be connected thereto. It can naturally be provided that the cable which is routed to the discharge valve is directly connected to the electromagnet, or is indirectly connected via corresponding electrical connecting power conductors or connecting power cables which are assigned to the discharge valve.

For example, in the event that the main controller is arranged in a switch cabinet having little space for further components, the modification unit can be provided externally thereto, in a remote arrangement, in a problem-free manner. Under the general circumstance in which the modification unit is retrofitted, in such a case, it would therefore only be necessary, either for new cables to be run from the main controller to the modification unit or the discharge valve or, alternatively, for the existing cable between the main controller and the discharge valve to be interrupted and the modification unit integrated in the latter.

Correspondingly, it can be provided, according to the invention, that the modification unit is arranged remotely from the main controller, in particular, externally to a or the housing of the main controller.

The main control unit can preferably be configured such that, for each movement of the closure member from the closing position to the open position, it respectively generates an output voltage signal, particularly having a constant voltage amplitude of a magnitude greater than zero, which is sufficient to move the closure member, by the action of the electromagnet, from the closing position to the open position. The modification unit can moreover be configured such that it modifies each of these output voltage signals during a modification time interval, namely, either over the entire signal duration of the respective output voltage signal or over a fractional time interval of the signal duration of the respective output voltage signal, such that the mean voltage amplitude of the respective output voltage signal over the modification time interval is lower than would be the case, were the respective output voltage signal not be modified. This can be achieved, for example, by the appropriate timing of the respective output voltage signal during the modification time interval.

In this connection, the modification unit can further be configured such that the voltage amplitude of the respective output voltage signal, without modification by the modification unit, respectively assumes a constant value over the entire signal duration, and that, by the timing of the respective output voltage signal during the modification time interval, the r.m.s. value of voltage amplitude during this modification time interval is less than 50% of the value of the above-mentioned constant voltage amplitude of the output voltage signal.

The modification unit can further be configured such that the voltage amplitude of the respective output voltage signal, without modification by the modification unit, respectively assumes a constant value of 24 V over the entire signal duration, and that the respective output voltage signal during the modification time interval is modified such that the r.m.s. value of voltage amplitude during the modification time interval is lower than 12 V, and preferably lower than 10 V.

With regard to the above-mentioned timing of the respective output voltage signal, this can be executed such a preferably periodic sequence of individual, particularly square-wave signal pulses with first voltage amplitudes is generated, particularly of voltage amplitudes which correspond to the voltage amplitude of the respective, and as yet unmodified output voltage signal wherein, for the entire sequence of signal pulses, in each case, two sequential signal pulses are respectively separated from one another by a signal pause having a second voltage amplitude, which is lower in comparison with the first voltage amplitudes, particularly a voltage amplitude having a magnitude of zero.

With regard to the modification time interval, during which the respective output voltage signal is modified, this can respectively succeed a time interval in which no modification of the respective output voltage signal is executed, and in which the voltage amplitude of the output voltage signal which is relayed to the electromagnet corresponds to the voltage amplitude of the respectively unmodified output voltage signal which is generated by the main controller.

The respective output voltage signal during the above-mentioned time interval, in which no modification occurs, can generate an opening current in the electromagnet, as a result of which the closure member is moved from the closing position to the opening position and, during the subsequent modification time interval, can generate a holding current which is lower, in relation to the opening current.

Appropriately, the modification unit can comprise an electronic circuit for the execution of the modification of output voltage signals, particularly a driver.

The modification unit can further comprise an analyzer device, which is particularly configured in the form of a microcontroller, for the analysis of respective output voltage signals and/or a device for detecting operating states of the discharge valve, particularly of the electromagnet of the discharge valve, or for detecting faults such as, for example, a failure in the power cable between the modification unit and the discharge valve.

The modification unit can further comprise a display for the representation of information and/or a transmitter unit, particularly for the wireless transmission of information to a remote receiver unit, particularly information with respect to operating states of the discharge valve or cable faults.

The modification unit can further comprise a preferably electronic memory in which, preferably by means of the microcontroller, information can be saved and/or from which, preferably by means of the microcontroller, information can be retrieved, preferably, in particular, information which is generated or delivered by the microcontroller with respect to operating states of the discharge valve, or with respect to faults on the power cable which is routed from the main control unit to the modification unit, or on the power cable which is routed from the modification unit to discharge valve.

With regard to the main control unit, the latter can be configured such that it energizes the output voltage signals with an additional minimum voltage, for the supply of energy to the modification unit.

BRIEF DESCRIPTION OF THE DRAWINGS

Further features of the present invention proceed from the attached patent claims, from the following description of preferred exemplary embodiments of the invention, and from the attached drawings. In the drawings:

DETAILED DESCRIPTION OF PREFERRED EMBODIMENTS

Figure 1:
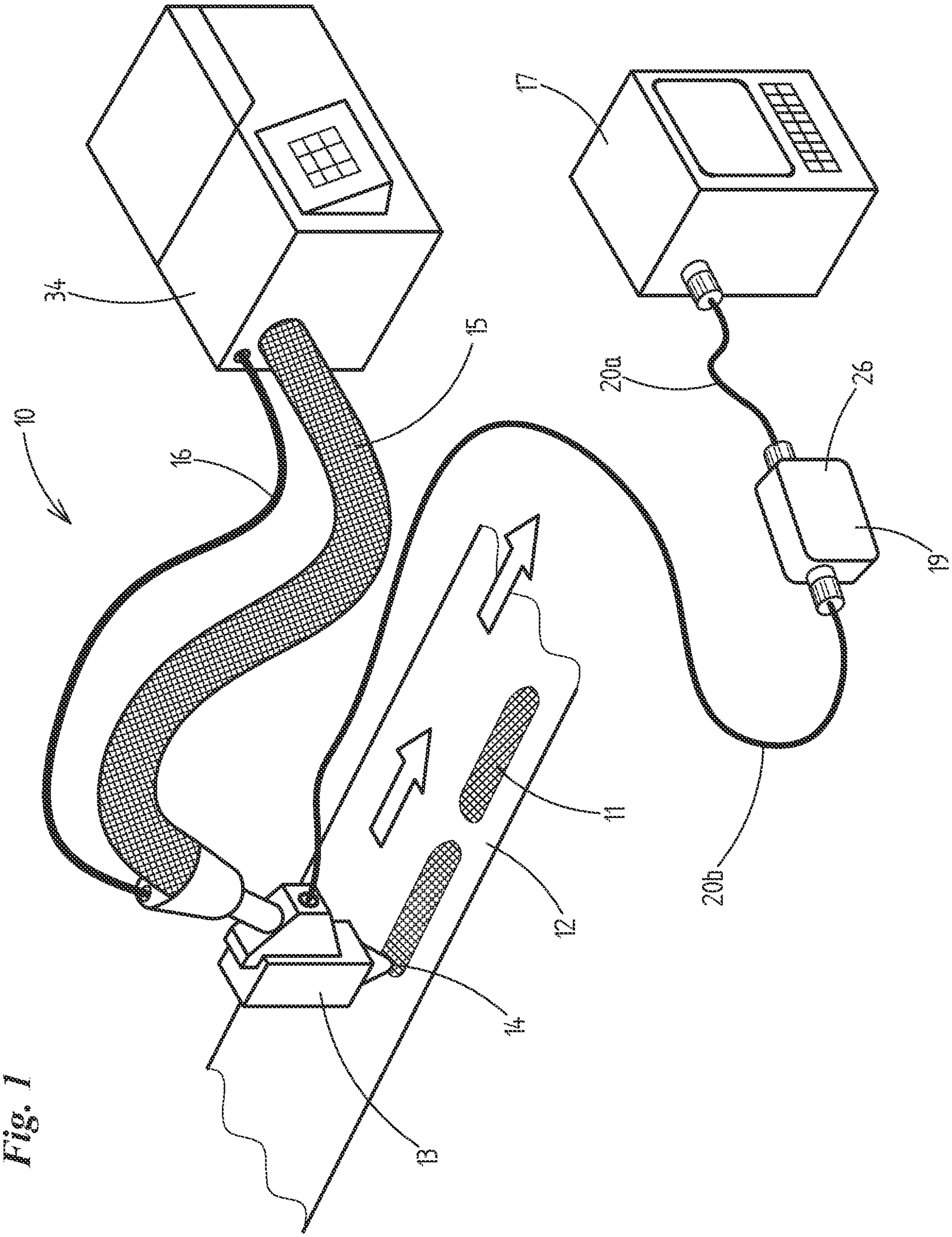
FIG. 1 shows an oblique view (schematic representation) of an application device according to the invention, having an electromagnetically operated discharge valve for the application of portions of a fluid medium to a substrate, having a main controller for generating output voltage signals for the discharge valve, and having a modification unit for the modification of output voltage signals.
Figure 2:
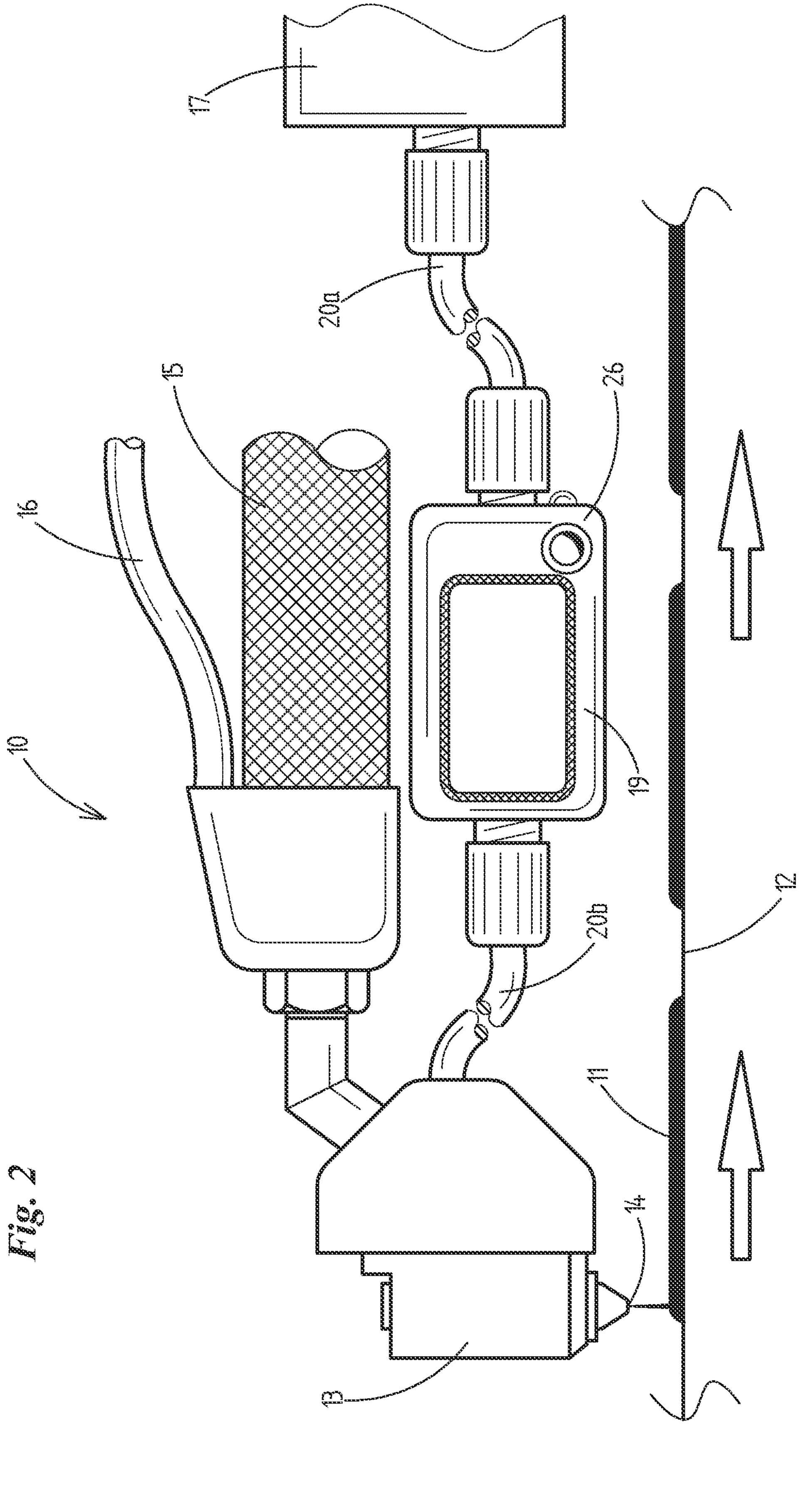
FIG. 2 shows a side view of a section of the device according to FIG. 1.

In the present example, the application device 10 represented in FIG. 1 is employed for the application of mutually spaced (longitudinal) portions 11 of a flowable medium, in the present case a hotmelt adhesive, to a substrate 12, in the present case a material web 12 (in the present case, in particular, a material web of paper).

The material web represented is only one example of a substrate 12, to which an application device 10 according to the invention can apply a flowable medium. It is understood that the invention is not limited to this type of substrate.

For the application of medium portions 11, in the present case, the application device 10 comprises, by way of a core component, a discharge valve 13 which is known per se and which, in a likewise known manner, has an unrepresented closure member which, by means of an unrepresented electromagnet, can be moved from a closing position, in which it closes a (lower) metering opening 14 of the discharge valve 13, to an (upper) open position.

In the closing position, a closure member of this type is generally secured by a closure element which exerts a closing force, for example a spring which applies a reset force, or by means of permanent magnets, the mutual repulsion of which delivers a closing force.

The closure member forms the armature of the electromagnet and, correspondingly, at least in sections, is formed of a metallic material, such that the magnetic field generated by the electromagnet is able to move the closure member into the open position.

The liquid medium or, in the present case, the liquid hotmelt adhesive is delivered to the discharge valve 13 from a corresponding medium source 34, in the present case a melting device, via a medium line 15 or medium hose which, in the present case, is heated by means of a heater. A power cable 16, which is connected to a power supply unit of the medium source 14, supplies power to the heater for the medium line 15.

For the delivery of individual medium portions 11, the electromagnet of the discharge valve 13 is controlled in an appropriate manner. To this end, the application device 10 comprises a main control unit 17, in the present case a PLC (programmable logic controller), which periodically generates individual output voltage signals 18 which are mutually spaced in time—see FIG. 3—and are delivered to the electromagnet of the discharge valve 13.

These output voltage signals are previously modified, in a manner which is described in greater detail hereinafter, by a modification unit 19 which is arranged between the discharge valve 13 and the main controller 17, which unit receives output voltage signals from the main control unit 17, which are then modified and finally relayed, in a modified form, as modified output voltage signals 18 to the discharge valve 13 or to the electromagnet of the discharge valve 13. In other words, the main controller 17, the modification unit 19 and the discharge valve 13, or the electromagnet thereof, are electrically connected or arranged in series (in a sequential manner).

The modification unit 19, in a series-connected arrangement, is thus firstly connected by means of a first power cable 20*a* to the main controller 17 in an electrically conductive manner and, secondly, is connected by means of a second power cable 20*b* to the discharge valve 13 or to the electromagnet in an electrically conductive manner.

In the present case, the main controller 17 generates individual (electric) output voltage signals in a periodic manner, i.e., mutually spaced in time, each of which has a constant voltage amplitude or constant voltage value over the full signal duration, in the present case 24V respectively.

Figure 3:
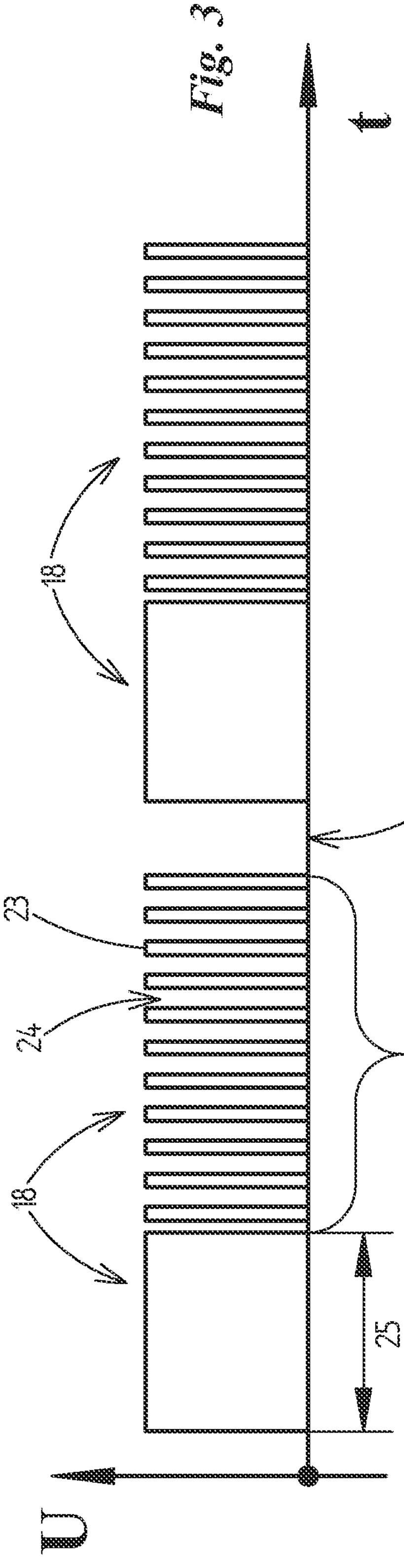
FIG. 3 shows a diagram representing output voltage signals which are modified by means of the modification unit, wherein the electric voltage U is plotted on the x-axis and time t is plotted on the y-axis.

In the diagram according to FIG. 3, for exemplary purposes, two sequential output voltage signals 18 which have been modified by the modification unit 19 are represented.

Firstly, a time interval 21 can be observed between the two modified output voltage signals 18. This also corresponds to the time interval between the unmodified output voltage signals, in the form in which they are received by the modification unit 19.

The modification unit 19 ensures that each of the output voltage signals received by the latter is modified within a modification time interval 22, which is shorter than the overall signal duration of the respectively received output voltage signal, or which forms a subinterval of the overall signal duration. Conversely, in a preceding time interval 25, or during the remainder of the signal duration, the respectively received output signal is not modified such that, at this point, the modified output voltage signal 18 which is relayed by the modification unit 19 corresponds to the received or unmodified output signal.

Figure 4:
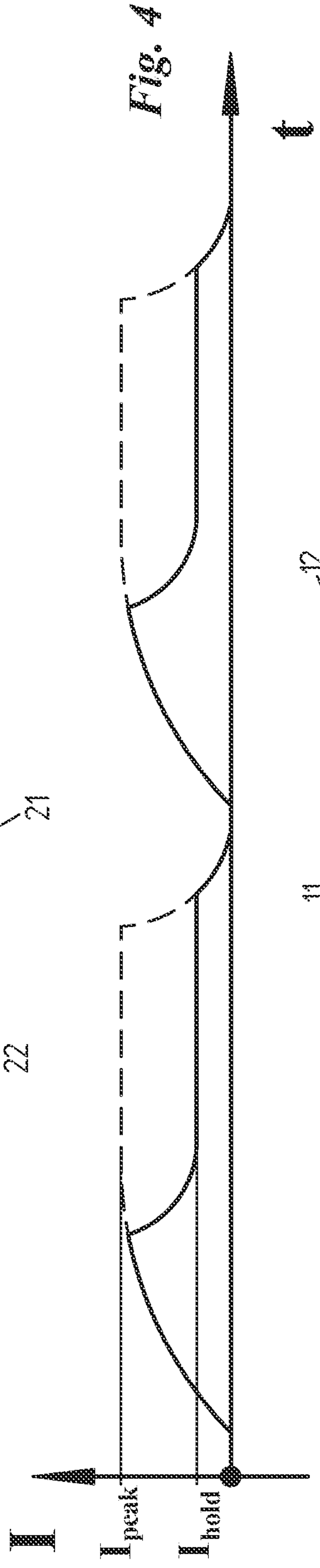
FIG. 4 shows a temporally structured diagram, which represents the time characteristic of the electric current I (on the x-axis) which is generated in an electromagnet of the discharge valve of the application device according to FIG. 1, if the latter is energized with output voltage signals according to FIG. 3.

Modification during the modification time interval 22 is executed such that, in the electromagnet of the discharge valve 13, a weaker current setting is applied—see FIG. 4—than would be the case in the absence of this modification.

In the present case, to this end, each output voltage signal 18 is timed within the modification time interval 22 such that, in each case, modified output voltage signals 18, (only) during this modification time interval 22, in place of the temporally constant voltage amplitude of the respectively received unmodified output voltage signal, contain a periodic sequence of individual, in the present case square-wave signal pulses 23.

In the present case, the respective voltage amplitude of each signal pulse 23 is of equal magnitude to the voltage amplitude of the unmodified output voltage signal.

In each case, two sequential signal pulses 23, moreover, are mutually separated by a signal pause 24, or by short time intervals 24 which are voltage-free, or in which the respective voltage amplitude is zero.

In place of signal pauses 24 with respective voltage amplitudes of zero, the voltage pulses 23 might also be theoretically separated by voltage pulses having a respective magnitude which is greater than zero, but is lower than the voltage amplitude of the unmodified output voltage signals.

Modified output voltage signals 18 according to the invention, in the present case according to FIG. 3, in the electromagnet of the discharge valve 13, generate a characteristic for the current I flowing therein represented in FIG. 4.

The signal portion of the modified output voltage signal 18 corresponding to the time interval 25 in which the modified output voltage signal 18 matches the unmodified output voltage signal results in a rise in the current I in the electromagnet, up to a maximum value $I_{peak}$.

This, in turn, results in a magnetic field (of maximum strength) of the electromagnet, which generates the requisite magnetic force to produce an opening motion of the closure member of the discharge valve 13, by means of which the reset force which holds the closure member in the closing position can be overcome.

The broken line in FIG. 4 represents the subsequent time characteristic of the current curve I which would be established with no modification of the output voltage signal 18, or in the absence of any such modification unit 19. The current I, up to the respective end of the unmodified output voltage signal, would thus remain at the value $I_{peak}$.

Conversely, the modification according to the invention, or the timing of the respective output voltage signal 18 described herein, results instead in a reduction in current during the modification time interval 22.

In the present case, timing is executed such that the resulting mean value of voltage amplitude during the modification time interval is lower than the voltage amplitude of the unmodified voltage signal, in the present case lower than 50% thereof. The r.m.s. value of voltage amplitude during the modification time interval 22 is lower than 12 volts, and preferably lower than 10 volts.

The modification of the output voltage signal 18 is selected such that, during the modification time interval 22, in practice, a holding current (hold is established in the electromagnet, which is sufficient to maintain the closure member of the discharge valve 13 in the holding position. The electromagnet delivers a magnetic force which is lower, and which can be lower than the opening force which is required to permit the movement of the closure member into the open position by the opening motion.

By means of this current reduction, in addition to energy saving effects, in particular, the electromagnet undergoes a lower in-service heat-up than would be the case, were it to be operated with the (higher) opening current over the full respective signal duration. As a result, inter alia, unwanted influences of the corresponding waste heat from the electromagnet upon the flowable medium can be reduced.

Figure 5:
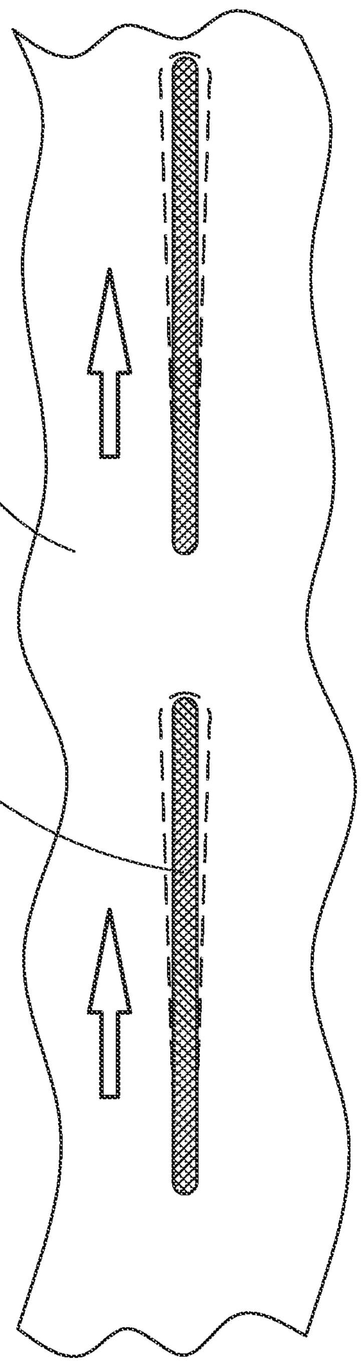
FIG. 5 shows an overhead view of a partial section of the substrate represented in FIG. 1, with medium portions which have been applied by the discharge valve according to FIG. 1, which is controlled by the output voltage signals represented in FIG. 3.
Figure 6:
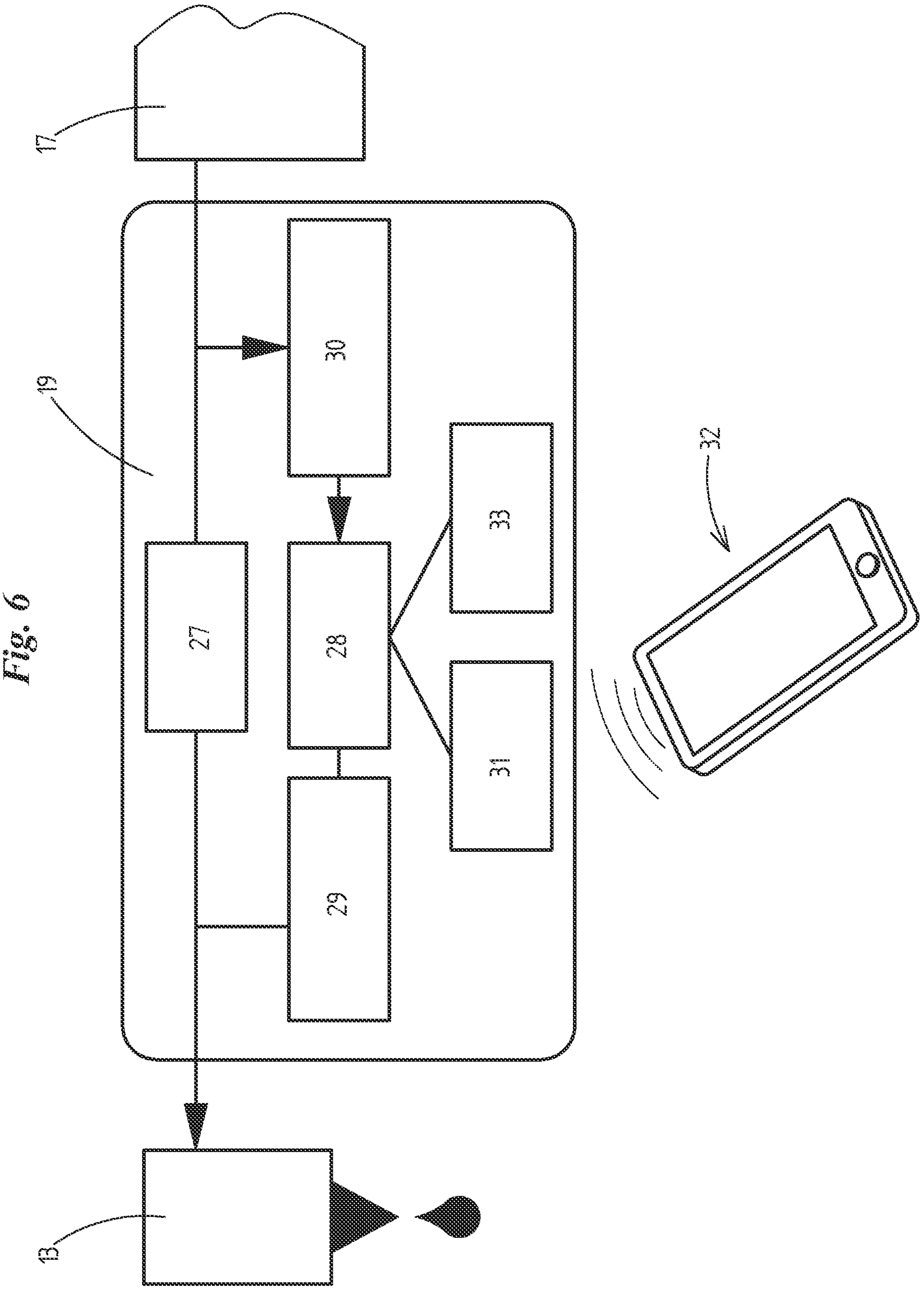
FIG. 6 shows a schematic sketch of the modification unit represented in FIG. 1, and the arrangement thereof between the discharge valve and the main controller.

In FIG. 5, broken lines indicate the shape which, in each case, would disadvantageously be assumed by the medium portion 11 in the event of an excessively strong heat-up of the discharge valve 13, namely, with a potential spreading thereof, in comparison with the optimum shape.

Finally, with regard to the design of the modification unit 19, the latter comprises inter alia in the present case a (protective) housing 26.

Within the housing 26, in addition to other components, a driver 27 is located, namely, an appropriate electronic circuit which is responsible for the actual modification of the incoming unmodified output voltage signal.

In the present case, moreover, a microcontroller 28 is arranged therein, which is capable of analyzing the incoming output voltage signal—see reference number 29. It can be provided that the microcontroller 28 detects operating states of the discharge valve 13, particularly of the electromagnet of the discharge valve 13, or detects faults such as, for example, a failure of one of the power cables 20*a* or 20*b*.

The modification unit 19 can comprise a preferably electronic memory, which is not represented. In the latter, the microcontroller 28 can save the above-mentioned information regarding operating states of the discharge valve 13 or faults in the power cables 20*a*, 20*b*. This information can then be read-out or retrieved later, if required.

In the present case, the modification unit 19 moreover comprises an energy supply unit 30, particularly for the driver 27 and the microcontroller 28.

This can be connected, for example by means of a separate power cable, to a remote voltage supply, for example to a voltage supply which is delivered by the main controller 17.

It is also conceivable, however, that the main control unit 17 energizes the individual output voltage signals with an additional minimum voltage, which is then converted by the energy supply unit 30 into useful energy for those corresponding components or modules of the modification unit which require energy.

It is further conceivable that the modification unit 19 comprises a radio module 31, which wirelessly delivers operating states thus determined, or other information, particularly further to the read-out thereof from the above-mentioned memory, to a corresponding (remote) receiver, for example to a smartphone 32. Additionally or alternatively, a display 33 for the representation of such information can also be provided.

LIST OF REFERENCE NUMBERS

10 Application device
11 Medium portions
12 Substrate
13 Discharge valve
14 Metering opening
15 Medium line
16 Power cable
17 Main control unit
18 Modified output voltage signal
19 Modification unit
20*a* Power cable
20*b* Power cable
21 Interval
22 Modification time interval
23 Signal pulse
24 Signal pause
25 Time interval
26 (Protective) housing
27 Driver
28 Microcontroller
29 Analysis
30 Energy supply unit
31 Radio module

32 Smartphone
33 Display
34 Medium source

The invention claimed is:

1. An application device for applying a flowable medium onto a substrate the device having a discharge valve (13) comprising a closure member which, in an open position, releases a metering opening of the discharge valve, such that the flowable medium is flowable through the metering opening in a direction of the substrate, wherein the closure member is movable by an electromagnet of the discharge valve (13) from a closing position, in which the discharge valve (13) closes the metering opening, to the open position, and comprising a main control unit (17), which is connected to the discharge valve (13), and which delivers output voltage signals for controlled voltage supply of the electromagnet, the output voltage signals move the closure member to the open position and maintain the closure member in the open position, further comprising a modification unit (19) arranged between the main control unit (17) and the discharge valve (13), the modification unit (19) configured such that the modification unit (19) receives the output voltage signals from the main control unit (17), modifies the output voltage signals, and relays the output voltage signals in a modified form to the electromagnet, wherein the main control unit (17) is configured such that, for each movement of the closure member from the closing position to the open position, the main control unit (17) respectively generates an output voltage signal which is sufficient to move the closure member, by action of the electromagnet, from the closing position to the open position, and wherein the modification unit (19) is configured such that the modification unit (19) modifies each respective output voltage signal during a modification time interval (22), such that a mean voltage amplitude of the respective output voltage signal over the modification time interval (22) is lower than a respective unmodified output voltage signal, and wherein a respective modification time interval (22), during which the respective output voltage signal is modified, respectively succeeds a time interval in which no modification of the respective output voltage signal is executed, and in which the voltage amplitude of the output voltage signal which is relayed to the electromagnet corresponds to a voltage amplitude of the respective unmodified output voltage signal which is generated by the main control unit (17).

2. The application device as claimed in claim 1, wherein, for transmission of output voltage signals to the modification unit (19), a power cable is routed from the main control unit (17) to the modification unit (19) and wherein, for transmission of modified output voltage signals to the electromagnet, a power cable is routed from the modification unit (19) to the discharge valve (13).

3. The application device as claimed in claim 1, wherein the modification unit (19) modifies each of these output voltage signals during a modification time interval (22) by the timing of the respective output voltage signal during the modification time interval (22).

4. The application device as claimed in claim 3, wherein a voltage amplitude of the respective output voltage signal, without modification by the modification unit (19), respectively assumes a constant value over the entire signal duration, and wherein, by the timing of the respective output voltage signal during the modification time interval (22), an r.m.s. value of the voltage amplitude during the modification time interval (22) is less than 50% of the constant value of the voltage amplitude of the output voltage signal.

5. The application device as claimed in claim 3, wherein a voltage amplitude of the respective output voltage signal, without modification by the modification unit (19), respectively assumes a constant value of 24 V over the entire signal duration, and wherein the respective output voltage signal during the modification time interval (22) is modified such that an r.m.s. value of the voltage amplitude during the modification time interval (22) is lower than 12 V.

6. The application device as claimed in claim 3, wherein the timing of the respective output voltage signal is executed such that a periodic sequence of individual square-wave signal pulses with first voltage amplitudes is generated, namely of voltage amplitudes which correspond to a voltage amplitude of the respective unmodified output voltage signal, wherein, for an entire sequence of signal pulses, two sequential signal pulses are respectively separated from one another by a signal pause having a second voltage amplitude, which is lower in comparison with the first voltage amplitudes, namely a voltage amplitude having a magnitude of zero.

7. The application device as claimed in claim 1, wherein the respective output voltage signal, during the time interval in which no modification occurs, generates an opening current in the electromagnet, as a result of which the closure member is moved from the closing position to the open position, and wherein the respective output voltage signal, during a subsequent modification time interval (22), generates a holding current which is lower, in relation to the opening current.

8. The application device as claimed in claim 1, wherein the modification unit (19) is arranged remotely from the main control unit (17), external to a housing of the main control unit (17).

9. The application device as claimed in claim 1, wherein the modification unit (19) comprises an electronic circuit for the execution of the modification of the output voltage signals, namely a driver.

10. The application device as claimed in claim 1, wherein the modification unit (19) comprises an analyzer device, which is configured as a microcontroller, for the analysis of respective output voltage signals and/or a device for detecting operating states of the electromagnet of the discharge valve (13), or for detecting faults.

11. The application device as claimed in claim 1, wherein the modification unit (19) comprises a display for representation of information and/or a transmitter unit, namely for wireless transmission of information to a remote receiver unit, the information being with respect to operating states of the discharge valve (13) or cable faults.

12. The application device as claimed in claim 1, wherein the modification unit (19) comprises an electronic memory in which, by means of a microcontroller, information is savable and/or from which, by means of the microcontroller, information is retrievable, the information being information which is generated or delivered by the microcontroller with respect to operating states of the discharge valve, or with respect to faults on the power cable which is routed from the main control unit (17) to the modification unit (19), or on a power cable which is routed from the modification unit (19) to the discharge valve (13).

13. The application device as claimed in claim 1, wherein the main control unit (17) is configured such that it energizes the output voltage signals with an additional minimum voltage, for supply of energy to the modification unit (19).

14. A modification unit for an application device for applying a flowable medium onto a substrate, wherein the application device is provided with a discharge valve (13)

comprising a closure member which, in an open position, releases a metering opening of the discharge valve (13), such that the flowable medium is flowable through the metering opening in a direction of the substrate, wherein the closure member is movable by an electromagnet of the discharge valve (13) from a closing position, in which the discharge valve (13) closes the metering opening, to the open position, and wherein the application device comprises a main control unit (17), which is connected to the discharge valve (13) and which delivers output voltage signals for controlled voltage supply of the electromagnet, the output voltage signals move the closure member to the open position and maintain the closure member in the open position, and wherein the modification unit (19) is configured such that the modification unit (19) is arrangeable between the main control unit (17) and the discharge valve (13), receives the output voltage signals from the main control unit (17), modifies the output voltage signals, and relays the output voltage signals in a modified form to the electromagnet, and wherein the modification unit (19) is configured such that the modification unit (19) modifies each respective output voltage signal generated by the main control unit (17) for a movement of the closure member from the closing position to the open position, which is sufficient to move the closure member, by the action of the electromagnets, from the closing position to the open position, during a modification time interval (22), such that a mean voltage amplitude of the respective output voltage signal over the modification time interval (22) is lower than a respective unmodified output voltage signal, and wherein the respective modification time interval (22), during which the respective output voltage signal is modified, respectively succeeds a time interval in which no modification of the respective output voltage signal is executed, and in which the voltage amplitude of the output voltage signal which is relayed to the electromagnet corresponds to a voltage amplitude of the respective unmodified output voltage signal which is generated by the main control unit (17).

15. The modification unit as claimed in claim 14, wherein the modification unit (19) is configured such that the modification unit (19) modifies each respective output voltage signal during a modification time interval (22) by a timing of the respective output voltage signal during the modification time interval (22).

* * * * *